Figure 1:
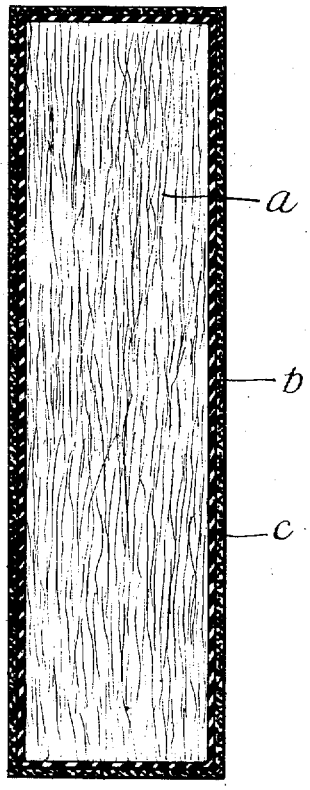

A. C. FISCHER

March 14, 1933.

Re. 18,765

CONSTRUCTIONAL MATERIAL

Original Filed March 19, 1928

Arthur C. Fischer

Inventor:

Reissued Mar. 14, 1933

Re. 18,765

UNITED STATES PATENT OFFICE

ALBERT C. FISCHER, OF CHICAGO, ILLINOIS, ASSIGNOR TO THE PHILIP CAREY MANUFACTURING COMPANY, A CORPORATION OF OHIO

CONSTRUCTIONAL MATERIAL

Original No. 1,770,361, dated July 8, 1930, Serial No. 262,781, filed March 19, 1928. Application for reissue filed November 17, 1930. Serial No. 496,317.

This case is a continuation in part of my application Serial No. 75,152, filed December 12, 1925, for packaging sealing means for expansion joints, and which matured on July 8, 1930, in Patent No. 1,770,357.

This invention relates to expansion joints surfaced with a rubber film in order to make same waterproof and airtight, acting as a packaging sealing means, preserving the body of the joint and preventing adhesion to other strips when crated. By expansion joints are meant premoulded expansion strips, as known to the art.

Absorption tests are made by highway officials in order to judge the value of expansion joints, and inasmuch as light and air affect bituminous materials it is a desirable feature to coat the expansion joint surface with a material which will prevent access of air or light to the bituminous material.

The preformed expansion joints may be made up in any suitable way, as is known to the art, and they are usually prepared in strips ¼ inch to 2 inches in thickness, and in any length up to 12 or 15 feet, and in width equal to the depth of the pavement or structure in which they are to be used.

In preventing ingress of light and air into the outside pores of the expansion joint the life of the material will be preserved.

Likewise expansion joints are formed out of fibrous materials matted, and my purpose would be to surface saturate or coat such fibrous matted sheets with the same rubber coating material which consists primarily of uncoagulated latex. This material is furnished in uncoagulated state and contains about two (2) per cent ammonia, thirty-three (33) per cent rubber and approximately sixty-five (65) per cent water. The sheets may be immersed in this uncoagulated latex and this mixture, or the mixture may be applied to the surface of the sheets by spraying. This can be accomplished with any suitable rigging for paint sprayers, which are known to the market. The moisture will evaporate, leaving a rubber film upon the surface and filling the pores of the fibrous matted material, or the expansion joint, as described.

It is readily understood that where the fibrous material is not saturated with bituminous material the statement relative to air and light would not apply, but it would make the fibrous matted material waterproof.

The body structure of the joint may be composed of linear fiber, interlaced matted fibrous material, webs, strips of fibrous material, a mixture of waterproofing material and linear fibers, a mixture of waterproofing material and flake-like structures composed of fibrous material, and a mixture of waterproofing material, flake-like structure and linear fibres. The body structure may be waterproofed or dry, depending upon the uses to which the product is to be put.

This invention relates particularly to coating the body structure with a film of rubber, preferably done by spraying latex as the most convenient form, and after coating with a film of rubber the entire strip or body is immersed in a waterproof coating, preferably of bituminous material, or bituminous material mixed with other lighter oils, or bituminous material mixed with vegetable oils, either in the blown or natural state, or any suitable composition which would preserve the rubber film over the body structure.

This invention is not limited to expansion joints, but may be used in construction work in general. The advantage of the rubber film is that it toughens the structure and prevents rupture or breakage of the surface upon shock. Where a wholly bituminous coating is employed the bituminous coating may be readily ruptured, but where a rubber film impregnates or coats the surface this surface becomes flexible and tough and resists rupture.

In order to protect this rubber film coating I further waterproof it with a suitable coating, which will last well to the weather and at the same time keep the rubber from being exposed to the weather.

I may likewise vulcanize the rubber film by the heat due to immersion in heated asphalt, or by applying over the rubber film a heated bituminous coating, or by vulcanizing the material with a rubber film first and then coating with a bituminous coating.

Likewise this rubber coating may contain bituminous material, i. e. a suitable solution is made of bituminous material, lighter oils and dissolved rubber, or rubber in solution, and this coating placed over the compressible material as described.

Referring now to the drawing. Figure 1 represents a body of constructional material in a rectangular shape.

Figure 2:
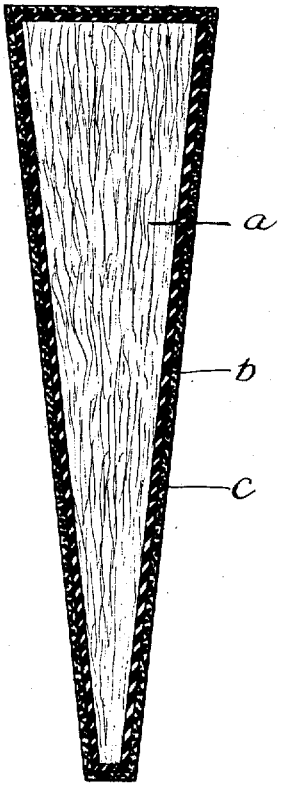

Figure 2 illustrates the same structure in a wedge shape.

In Figure 1 *a* represents the fibrous matted material, which may be any of the materials mentioned in the specification, *b* represents the rubber film over the body structure, and *c* the bituminous waterproof coating over the rubber film.

Uncoagulated latex, as described, can readily be purchased on the market, and is shipped in this state.

Likewise the surface may be treated with a sulphur dust, should it be desirable to vulcanize the surface film, or any other suitable vulcanizing agent may be used, which would impart some of its properties to the latex when placed upon the surface, and by heating the same a vulcanizing film will prevail. However, it is not essential that the film be vulcanized, as it is a very thin film.

Another object of my invention is to prepare an expansion joint with a bituminous material, the sides of which are produced without dusting material or interfering surfaces, and placing directly over this bituminous surface of the expansion joint a film of uncoagulated latex, thus closing all the pores and shutting out the light and air.

Expansion joints are often prepared in a heated state, and where this is done the evaporation of course, will be faster than where this does not occur.

The latex film will be particularly advantageous in preventing adhesion of the strips in shutting out the air and light, and in closing the pores, thus making the absorption properties of the joint practically zero.

Fibrous matted materials may be procured on the market in various shapes and forms, and insulating materials which are matted may be employed for this purpose when utilized for expansion joints, but it has always been found more practical to utilize bituminous mixtures with fibrous matter, because of the better resistance to strains and pressures.

The material produced by this treatment is waterproof, light and air proof and the surface may be coated with a dusting material if preferred, in which case the dusting material would either be applied first to the surface of the strips and then coated with latex, or the material would be coated with latex first and then have dusting material placed thereover. This would not be necessary in the case of fibrous matted material utilized for the purpose of expansion joints. This fibrous matted material may be a dried vegetable fiber, matted substance compressed, or any one of the numerous insulation materials which are found on the market, which will subject themselves to this treatment.

As it is not new to manufacture premoulded expansion joints, I am leaving to the art, as disclosed in the United States Patent Office over a long period of years, the various structures, as I believe there is invention and utility in a light, air and moisture proof film coating of latex.

I find also that I can make a satisfactory waterproof coating for the compressible fibrous material by mixing a high melting point blown bituminous material or a bituminous material fluxed with fluxing oil and rubber in a dissolved or natural state, or as reclaimed rubber. Such coating should have at least thirty per cent of rubber content, and may contain as high as fifty or sixty per cent rubber content. I heat the bituminous material to a liquid state and incorporate therein rubber in the dissolved, reclaimed or natural state. This method saves the double operation of separate treatments with rubber and bituminous coatings.

I claim:

1. Constructional material comprising a preformed compressible strip having the sides thereof surfaced with rubber, and over said surfacing another surface of bituminous material as described.

2. Constructional material comprising a preformed strip of waterproofed fibrous material, having the sides thereof surfaced with rubber, said surfaces being coated with another surface of bituminous waterproof coating.

3. Constructional material comprising a preformed strip of matted waterproofed fibrous material, having the sides thereof surfaced with rubber, said rubber having an additional surface of waterproofing material placed thereover.

4. Constructional material comprising a preformed compressible body, having the outer sides thereof surfaced with rubber, said surfaces having a coating placed thereover of bituminous waterproofing material.

5. Constructional material comprising a preformed compressible strip having the sides thereof surfaced with a coating of waterproofing material and rubber in combination.

6. A preformed expansion joint strip comprising a compressible core, a rubber envelope enclosing the core, and a bituminous coating covering the rubber envelope.

7. A preformed expansion joint strip comprising a waterproofed fibrous core, a rubber envelope enclosing the core, and a protective bituminous layer over the rubber envelope.

8. The process of fabricating a composition slab characterized by forming a core, coating said core with a layer of unvulcanized rubber, and applying a waterproofing layer over the rubber coating in a heated condition to vulcanize same.

9. The process of fabricating an expansion joint strip characterized by forming an expansible core, covering the core with a layer of vulcanized rubber, and applying a hot coating of bituminous material over the rubber layer to vulcanize same and attach a protective cover.

10. Construction material composed of a compressible body portion containing rubber and a bituminous coating covering and enclosing same.

11. An expansion joint comprising a preformed compressible elastic body portion containing rubber, said body surfaced with a bituminous surfacing.

12. Constructional material composed of a preformed composite structure including rubber as one element and a bituminous coating applied to enclose the composite structure.

13. Construction material composed of a preformed composite structure including rubber as one element and a bituminous coating applied to face the composite structure.

Signed at Chicago, in the county of Cook, State of Illinois, this 14th day of November, 1930.

ALBERT C. FISCHER.